(12) United States Patent
Kamigata et al.

(10) Patent No.: US 7,409,506 B2
(45) Date of Patent: Aug. 5, 2008

(54) MULTIPROCESSOR SYSTEM WITH HIGH-SPEED EXCLUSIVE CONTROL

(75) Inventors: Teruhiko Kamigata, Kawasaki (JP); Shinichiro Tago, Kawasaki (JP); Atsushi Ike, Kawasaki (JP); Yoshimasa Takebe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 248 days.

(21) Appl. No.: 11/113,056

(22) Filed: Apr. 25, 2005

(65) Prior Publication Data
US 2006/0143416 A1 Jun. 29, 2006

(30) Foreign Application Priority Data
Dec. 28, 2004 (JP) ............... 2004-380618

(51) Int. Cl.
*G06F 13/18* (2006.01)
*G06F 13/16* (2006.01)

(52) U.S. Cl. .............. 711/151; 711/152; 711/156; 711/158; 710/40; 710/260

(58) Field of Classification Search ......... 711/163, 711/167
See application file for complete search history.

(56) References Cited

U.S. PATENT DOCUMENTS 4,574,350 A * 3/1986 Starr ................ 710/200
5,339,443 A * 8/1994 Lockwood ............ 710/244
5,765,196 A * 6/1998 Liencres et al. ......... 711/143
6,286,090 B1 * 9/2001 Steely et al. ........... 711/207
6,330,604 B1 * 12/2001 Higuchi et al. .......... 709/226

FOREIGN PATENT DOCUMENTS

| JP | 4-343159 | 11/1992 |
|---|---|---|
| JP | 5-225117 | 9/1993 |
| JP | 6-110847 | 4/1994 |
| JP | 08-278953 A | 10/1996 |
| JP | 8-314869 | 11/1996 |
| JP | 9-282291 | 10/1997 |
| JP | 2000-187652 | 7/2000 |

* cited by examiner

*Primary Examiner*—B. James Peikari
(74) *Attorney, Agent, or Firm*—Arent Fox LLP.

(57) ABSTRACT

A multiprocessor system includes a plurality of processors, a shared bus coupled to the plurality of processors, a resource coupled to the shared bus and shared by the plurality of processors, and an exclusive control unit coupled to the plurality of processors and configured to include a lock flag indicative of a locked/unlocked state regarding exclusive use of the resource, wherein the processors include a special purpose register interface coupled to the exclusive control unit, and are configured to access the lock flag by special purpose register access through the special purpose register interface.

10 Claims, 6 Drawing Sheets

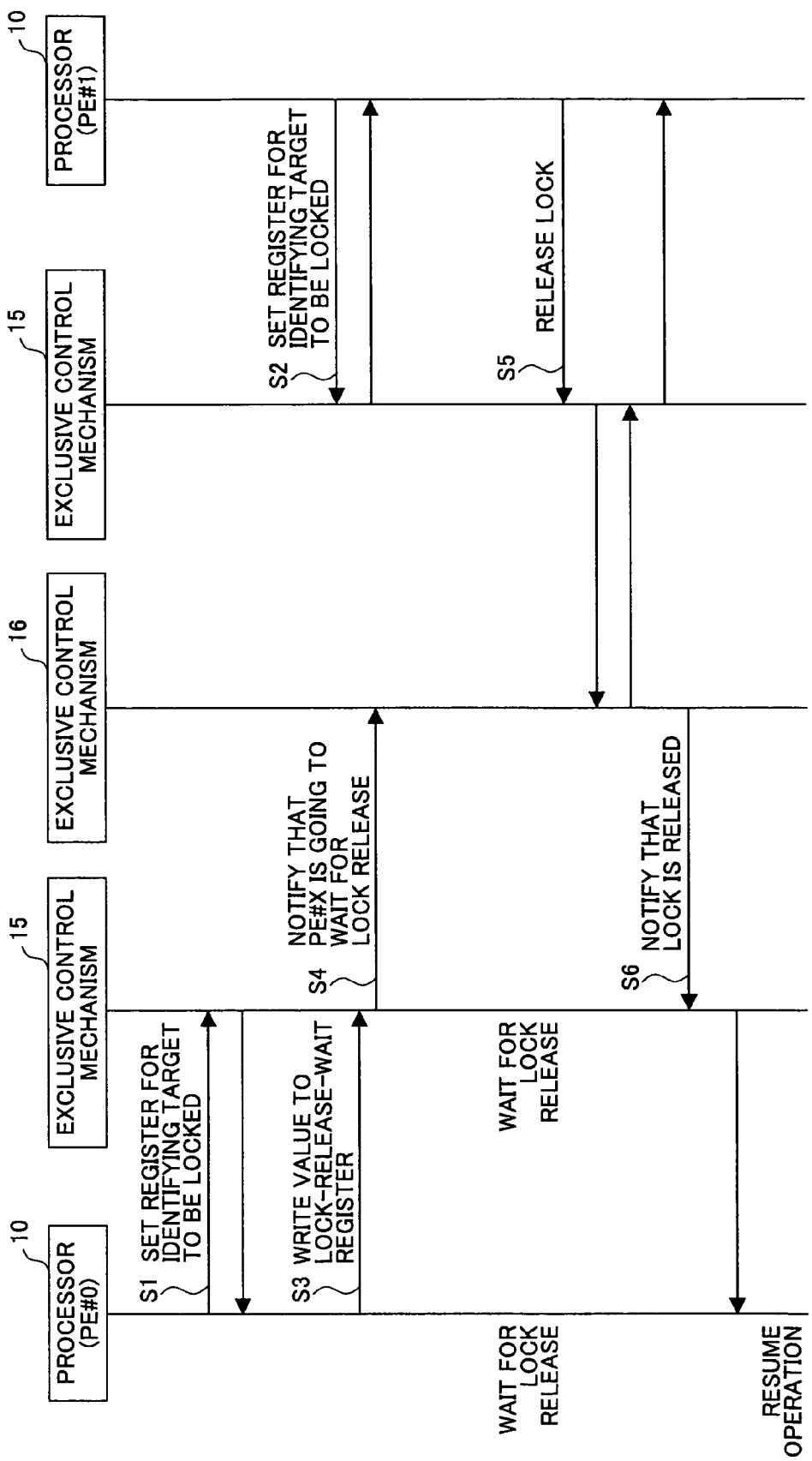

MULTIPROCESSOR SYSTEM WITH HIGH-SPEED EXCLUSIVE CONTROL

BACKGROUND OF THE INVENTION

1. Field of the Invention

The present invention generally relates to multiprocessor systems, and particularly relates to a multiprocessor system which manages exclusive control of shared resources.

2. Description of the Related Art

In the multiprocessor environments, i.e., in the environments in which systems are comprised of a plurality of processors, resources such as memories provided on a shared bus are shared by a plurality of processors. When a processor uses a memory, there may be a need under certain circumstances to exclusively use the memory for a predetermined duration by preventing the other processors from accessing the memory. Such a need arises because the consistency of the system cannot be maintained if the other processors access the memory or change the data during the ongoing transaction, for example. In order to grant exclusive use of shared resources, the control of the resources by use of a semaphore register is typically performed.

In the control of resources by use of a semaphore register, a processor wishing to gain exclusive control of a memory refers to a semaphore flag prior to access to the memory. If the flag is not on, it is ascertained that other processors are not using the memory. In such a case, the processor changes the flag to an on state so as to notify the other processors of its exclusive use of the memory, followed by accessing the memory. During the period in which the flag is on, the other processors cannot access the memory. When the use of the memory comes to an end, the processor having been using the memory cancels the on setting of the semaphore flag.

When a semaphore register is used, rigid control of the flag is necessary. A processor may refer to a semaphore flag, and may set the flag to an on state after confirming that the flag is not on, for example. If there is a time gap between the action of referring to the flag and the action of setting the flag, another processor may refer to the semaphore flag during this time gap. In such a case, the latter processor having referred to the semaphore flag ascertains that the memory is available because the flag is not on.

In order to avoid such a situation, the checking and setting of a semaphore flag is typically performed by use of a special access method called atomic LOAD/STORE. In this method, a read operation and a write operation are performed together as a single indivisible unit operation, i.e., are performed in a single bus cycle. Since the checking and setting of a flag is performed by carrying out a read operation and a write operation in a single bus cycle, this method achieves rigid flag control.

Patent Document 1 discloses a configuration in which a mechanism for managing exclusive control is provided between processors and a shared connection network. Further, Patent Documents 2 through 6 disclose a configuration which manages exclusive control by use of a special locking mechanism.

[Patent Document 1]
Japanese Patent Application Publication No. 2000-187652
[Patent Document 2]
Japanese Patent Application Publication No. 5-225117
[Patent Document 3]
Japanese Patent Application Publication No. 6-110847
[Patent Document 4]
Japanese Patent Application Publication No. 8-314869
[Patent Document 5]
Japanese Patent Application Publication No. 9-282291
[Patent Document 6]
Japanese Patent Application Publication No. 4-343159

In exclusive control methods used by related-art multiprocessor systems, a typical configuration is that the semaphore flag is provided in the memory space of a shared memory. Because of such a configuration, each processor needs to access the semaphore flag in the shared memory through a bus. This makes it necessary to attend to access arbitration at the time of bus access. If a cache mechanism or the like is provided between the processor and the shared memory, the processor needs to access the shared memory by going through a lengthy access path. This may further add to the access time. There is thus a problem in that processing time required for exclusive control becomes lengthy.

Accordingly, there is a need for a multiprocessor system in which the processing time required for exclusive control is short.

SUMMARY OF THE INVENTION

It is a general object of the present invention to provide a multiprocessor system that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a multiprocessor system particularly pointed out in the specification in such full, clear, concise, and exact terms as to enable a person having ordinary skill in the art to practice the invention.

To achieve these and other advantages in accordance with the purpose of the invention, the invention provides a multiprocessor system which includes a plurality of processors, a shared bus coupled to the plurality of processors, a resource coupled to the shared bus and shared by the plurality of processors, and an exclusive control unit coupled to the plurality of processors and configured to include a lock flag indicative of a locked/unlocked state regarding exclusive use of the resource, wherein the processors include a special purpose register interface coupled to the exclusive control unit, and are configured to access the lock flag by special purpose register access through the special purpose register interface.

Further, a method of controlling a lock flag according to the present invention is used in a multiprocessor system which includes a plurality of processors, a shared bus coupled to the plurality of processors, a resource coupled to the shared bus and shared by the plurality of processors. The method includes accessing a lock flag from one of the processors by way of special purpose register access through a special purpose register interface, the lock flag indicating a locked/unlocked state regarding exclusive use of the resource.

According to at least one embodiment of the present invention, the lock flag is provided inside the exclusive control unit separately from a main memory device, and provision is made to enable a locking operation that is performed through an access path different from an access path extending through the shared bus to the main memory device. To be specific, each of the processors is provided with the special purpose register interface, which allows the processors to access the lock flag of the exclusive control unit by executing a special purpose register access instruction. This makes it possible to achieve exclusive control without an intervening cache memory mechanism or intervening bus arbitration for the shared memory. Thus, high-speed exclusive control operation based on high-speed access is achieved.

BRIEF DESCRIPTION OF THE DRAWINGS

Other objects and further features of the present invention will be apparent from the following detailed description when read in conjunction with the accompanying drawings, in which:

FIG. 8 is a sequence diagram showing an example of the release wait operation of the multiprocessor system shown in FIG. 2.

DESCRIPTION OF THE PREFERRED EMBODIMENTS

In the following, the principle and embodiments of the present invention will be described with reference to the accompanying drawings.

Figure 1:
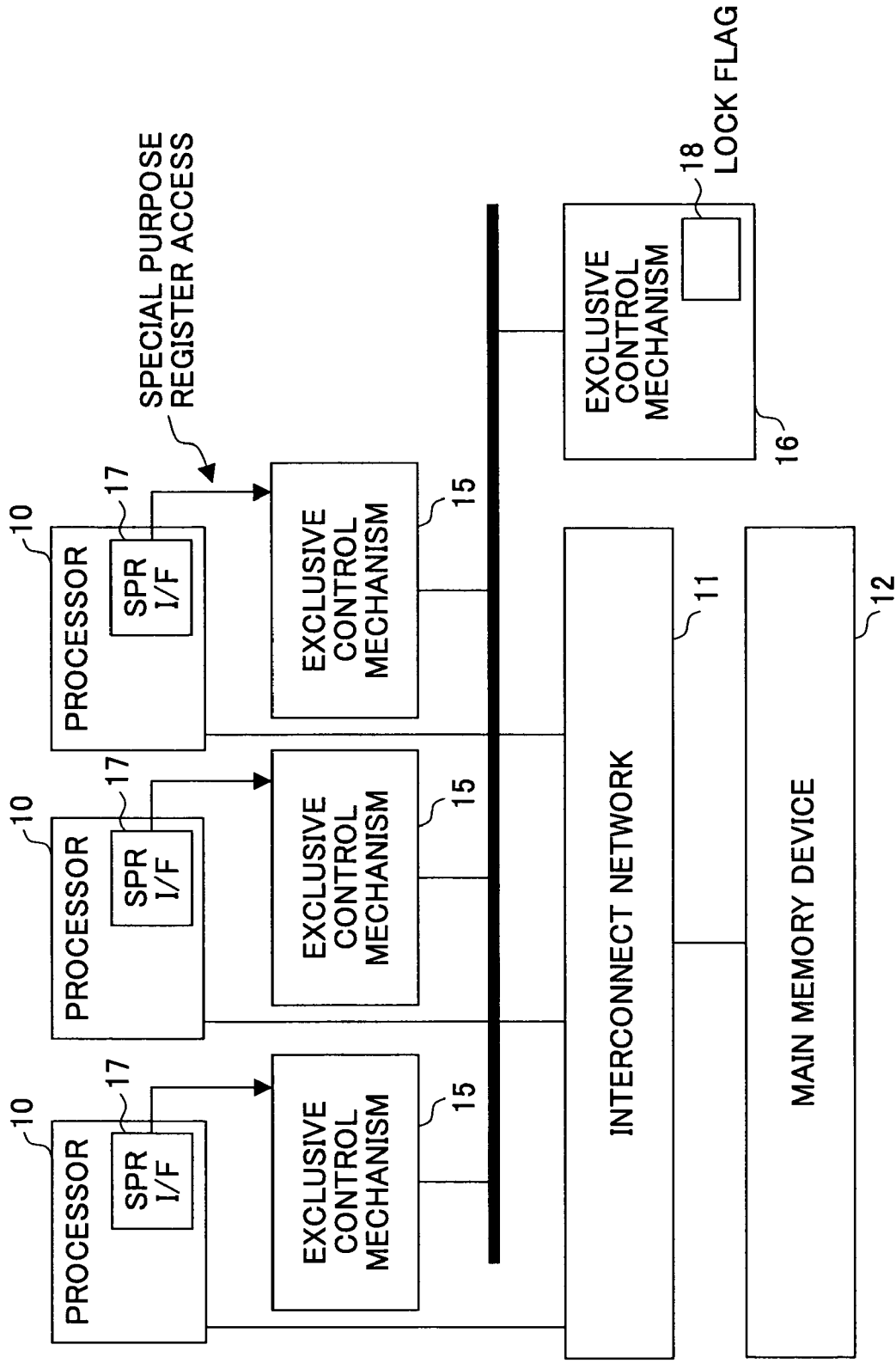
FIG. 1 is a block diagram showing a fundamental configuration of a multiprocessor system according to the present invention.

FIG. 1 is a block diagram showing a fundamental configuration of a multiprocessor system according to the present invention.

The multiprocessor system of FIG. 1 includes a plurality of processors 10, an interconnect network 11, a main memory device 12, first exclusive control mechanisms 15, and a second exclusive control mechanism 16. The processors 10 are coupled to the main memory device 12 serving as a shared memory through the interconnect network 11 that may be a bus. When reading or writing data from or to the main memory device 12, the processors 10 access the main memory device 12 via the interconnect network 11.

One first exclusive control mechanism 15 is provided for each of the processors 10. Namely, the number of the processors 10 and the number of the first exclusive control mechanisms 15 are identical. The processors 10 are coupled through the respective first exclusive control mechanisms 15 to the second exclusive control mechanism 16 that is shared. The second exclusive control mechanism 16 is provided with a lock flag 18 that is used for exclusive control operations.

Access from the processors 10 to the main memory device 12 is a typical memory access whereas access from the processors 10 to the lock flag 18 of the second exclusive control mechanism 16 through the first exclusive control mechanisms 15 is achieved by use of a special purpose register access (SPR access). In general, a processor has general-purpose registers for use by the user through programs, and also has special purpose registers provided for special purposes. The special purpose registers may be those registers which store specific values relating to specific instructions after the execution of such instructions. An example of special purpose registers includes a processor status register, which changes its status in response to an instruction executed by the processor, and serves to keep the processor status In the present invention, a special purpose register access instruction is provided in the processors 10 for the purpose of accessing the lock flag 18 of the second exclusive control mechanism 16. That is, such a special purpose register access instruction is provided in the instruction set of the processors 10, and a special purpose register interface (SPR I/F) 17 is provided in the processors 10 for exchange of signals with the first exclusive control mechanisms 15. When the special purpose register access instruction is executed, signals are exchanged with the first exclusive control mechanisms 15 via the interface 17, thereby accessing the lock register 18 of the second exclusive control mechanism 16.

In the multiprocessor system according to the present invention as described above, the lock flag 18 is provided inside the second exclusive control mechanism 16 separately from the main memory device 12, and provision is made to enable a locking operation that is performed through an access path different from an access path extending through the interconnect network 11 to the main memory device 12. To be specific, each of the processors 10 is provided with the special purpose register interface 17, which allows the processors 10 to access the lock flag 18 of the second exclusive control mechanism 16 by executing a special purpose register access instruction. This makes it possible to achieve exclusive control without an intervening cache memory mechanism or intervening bus arbitration for the shared memory. Thus, high-speed exclusive control operation based on high-speed access is achieved.

Figure 2:
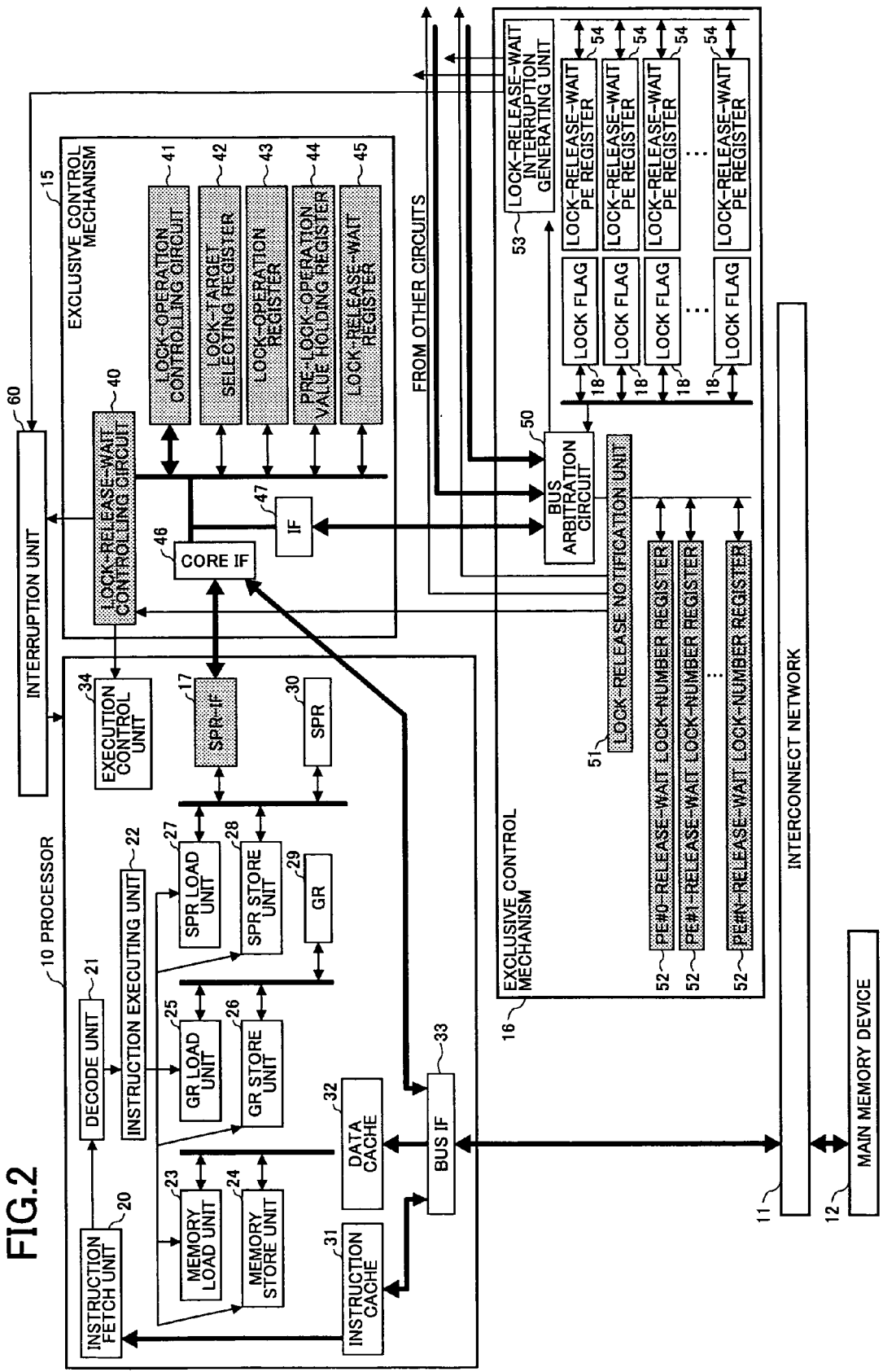
FIG. 2 is a block diagram showing an example of an embodiment of the multiprocessor system according to the present invention.

FIG. 2 is a block diagram showing an example of an embodiment of the multiprocessor system according to the present invention. The multiprocessor system of FIG. 2 includes a processor 10, the interconnect network 11, the main memory device 12, a first exclusive control mechanisms 15, the second exclusive control mechanism 16, and an interruption unit 60. For the sake of convenience of illustration, FIG. 2 only shows one processor 10 and one first exclusive control mechanism 15. As a system as a whole, however, a plurality of the processors 10 and a plurality of the first exclusive control mechanisms 15 are provided in the same manner as illustrated in FIG. 1.

The processor 10 includes the special purpose register interface (SPR I/F) 17, an instruction fetch unit 20, a decode unit 21, an instruction executing unit 22, a memory load unit 23, a memory store unit 24, a GR load unit 25, a GR store unit 26, an SPR load unit 27, an SPR store unit 28, a general-purpose register set (GR) 29, a special purpose register set (SPR) 30, an instruction cache 31, a data cache 32, a bus IF 33, and an execution control unit 34. The first exclusive control mechanism 15 includes a lock-release-wait controlling circuit 40, a lock operation controlling circuit 41, a lock-target selecting register 42, a lock-operation register 43, a pre-lock-operation value holding register 44, a lock-release-wait register 45, a core IF 46, and an interface (IF) 47. The second exclusive control mechanism 16 includes lock flags 18, a bus arbitration circuit 50, a lock-release notification unit 51, PE-release-wait lock-number registers 52, a lock-release-wait interruption generating unit 53, and lock-release-wait PE registers 54.

The instruction fetch unit 20 fetches instructions to be executed from the instruction cache 31 or the main memory device 12, and holds the fetched instructions. The decode unit 21 decodes the instructions kept in the instruction fetch unit 20. According to the decode results of the decode unit 21, the instruction executing unit 22 controls each part of the processor 10.

The memory load unit 23 loads data of a specified memory address from the data cache 32 or the main memory device 12 through the bus IF 33 and the interconnect network 11. The memory store unit 24 stores data at a specified memory address in the main memory device 12 through the bus IF 33 and the interconnect network 11, or stores the data in a corresponding storage area in the data cache 32.

The GR load unit 25 loads data from a specified general-purpose register of the general-purpose register set 29. The GR store unit 26 stores data in a specified general-purpose register of the general-purpose register set 29.

The SPR load unit 27 loads data from a specified special purpose register of the special purpose register set 30. The SPR load unit 27 further loads the values of the lock flags 18 of the second exclusive control mechanism 16 via the special purpose register interface 17 when the special purpose register access instruction of the present invention is executed. The SPR store unit 28 stores data in a specified special purpose register of the special purpose register set 30. The SPR store unit 28 further stores values in the various registers of the first exclusive control mechanism 15 via the special purpose register interface 17 when the special purpose register access instruction of the present invention is executed. Based on these stored values, the operation of the first exclusive control mechanism 15 is controlled so as to perform various operations relating to exclusive control as will be described later.

The execution control unit 34 serves to control the execution/suspension of the operation of the processor 10. The execution control unit 34 resumes the operation of the processor 10 after suspension, for example, in response to a signal from the lock-release-wait controlling circuit 40.

In the first exclusive control mechanism 15, the lock-release-wait controlling circuit 40 instructs the execution control unit 34 to resume the operation of the processor 10 in response to a notice of lock release received from the second exclusive control mechanism 16 when the processor 10 is in a suspended state waiting for lock release. Further, the lock-release-wait controlling circuit 40 instructs to resume the operation of the processor 10 in response to an interruption from the interruption unit 60 when the processor 10 is in a suspended state waiting for lock release.

In this manner, provision is made to suspend the operation of the processor 10 when the processor 10 is waiting for lock release, which can suppress the power consumption in the processor 10. At the time of lock release, the lock-release-wait controlling circuit 40 instructs the processor 10 to resume its operation, so that there is no need for the processor 10 to perform polling operations with respect to the first exclusive control mechanism 15 and the second exclusive control mechanism 16.

The lock operation controlling circuit 41 controls lock operations with respect to the second exclusive control mechanism 16 in response to a special purpose register access from the processor 10. Here, these lock operations are carried out with respect to a lock flag 18 indicated by the register value of the lock-target selecting register 42. The lock-target selecting register 42 receives a number indicative of a lock flag 18 subjected to locking operation from the processor 10 via the special purpose register interface 17, and stores the received number therein. The pre-lock-operation value holding register 44 stores therein the value of the lock flag 18 that is in existence immediately prior to the locking operation. The lock-release-wait register 45 stores therein a value that is written by the processor 10 via the special purpose register interface 17 when the processor 10 is going to wait for lock release.

The core IF 46 provides an interface with the special purpose register interface 17 of the processor 10, and also provides an interface with the bus IF 33. With this provision, the processor 10 can perform a lock operation by way of memory access via the bus IF 33 in addition to access via the special purpose register interface 17. With the provision of such function, it becomes possible for a debugger, for example, to view the contents of the registers of the first exclusive control mechanism 15 and the second exclusive control mechanism 16 as areas mapped to the memory space. This advantageously provides easy debugging operation.

In the second exclusive control mechanism 16, the bus arbitration circuit 50 attends to arbitration when more than one first exclusive control mechanism 15 request locking operation simultaneously. The bus arbitration circuit 50 selects one of the first exclusive control mechanisms 15 that are requesting locking operations simultaneously, and performs the locking operation requested by the selected first exclusive control mechanism 15. The lock-release notification unit 51 detects release of a lock subjected to lock-release wait when there is a processor 10 waiting for lock release, and notifies the lock-release-wait controlling circuit 40 of the first exclusive control mechanism 15 of the lock release. The PE-release-wait lock-number registers 52 store therein a number indicative of a lock flag 18 subjected to lock-release wait. The PE-release-wait lock-number registers 52 are provided in one-to-one correspondence with the respective processors 10. In FIG. 2, the PE-release-wait lock-number registers 52 are illustrated with respect to N+1 processors 10 comprised of PE (processor element) #0 through PE #N.

The lock flags 18 are provided in one-to-one correspondence with the respective shared resources. When a given shared resource is to be exclusively used, the corresponding lock flag 18 is locked. The locking of the lock flag 18 is effected by setting a value indicative of the locked state (e.g., a predetermined one of 0 and 1) in the lock flag 18. If there is only one shared resource, only one lock flag 18 may be provided.

The lock-release-wait interruption generating unit 53 detects release of a lock subjected to lock-release wait when there is a processor 10 waiting for the lock release, and instructs the interruption unit 60 to generate an interruption. In response to the instruction to generate an interruption, the interruption unit 60 issues an interruption to the processor 10 that is waiting for the lock release. In response to the interruption, the processor 10 having been waiting for the lock release exclusively accesses the shared resource that has been subjected to lock-release wait. The lock-release-wait PE registers 54 store therein numbers identifying the processors 10 waiting for lock release of the respective lock flags 18.

With the provision as described above, the processor 10 can perform other tasks until the lock is released. This can improve the efficiency of use of the processor 10. Further, there is no need for the processor 10 to perform polling operations with respect to the first exclusive control mechanism 15 or the second exclusive control mechanism 16 while attending to other tasks.

Figure 3:
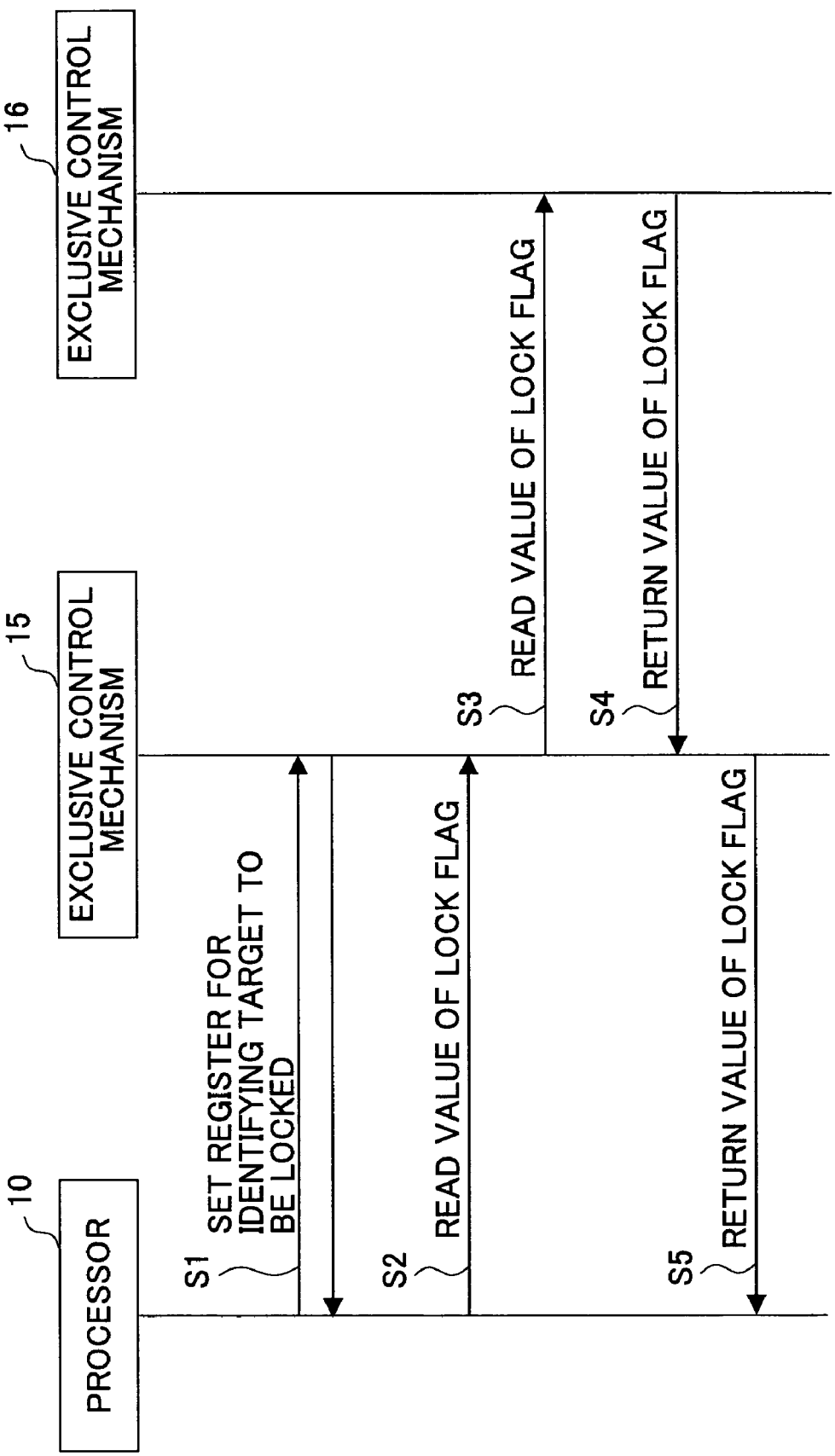
FIG. 3 is a sequence diagram showing an example of a basic operation of the multiprocessor system of FIG. 2.

FIG. 3 is a sequence diagram showing an example of a basic operation of the multiprocessor system of FIG. 2. With reference to FIG. 2 and FIG. 3, this basic operation will be described.

First, the SPR store unit 28 of the processor 10 stores in the lock-target selecting register 42 of the first exclusive control mechanism 15 a number identifying a lock flag 18 subjected to lock operation via the special purpose register interface 17 (S1). Next, the SPR load unit 27 of the processor 10 performs a load access with respect to the lock-operation register 43 of the first exclusive control mechanism 15 via the special purpose register interface 17 (S2). In response, the lock operation controlling circuit 41 of the first exclusive control mechanism 15 requests the second exclusive control mechanism 16 to read the lock flag 18 specified by the content of the lock-target selecting register 42 (S3). The bus arbitration circuit 50 of the second exclusive control mechanism 16 arbitrates requests from a plurality of the first exclusive control mechanisms 15, and reads the value of the specified lock flag 18, followed by supplying the retrieved value to the first exclusive control mechanism 15 (S4). The lock operation controlling circuit 41 of the first exclusive control mechanism 15 supplies to the processor 10 the value read from the lock flag 18 of the second exclusive control mechanism 16 (S5).

In this manner, the processor 10 obtains the value of the specified lock flag 18 of the second exclusive control mechanism 16. Namely, the reading of the lock flag 18 that is a fundamental operation necessary for gaining exclusive control through locking operation is achieved at high speed by use of a special purpose register access.

The operation for reading a lock flag as described above may be modified so as to provide various lock operations as will be described below, which may be useful in the management of exclusive control.

Figure 4:
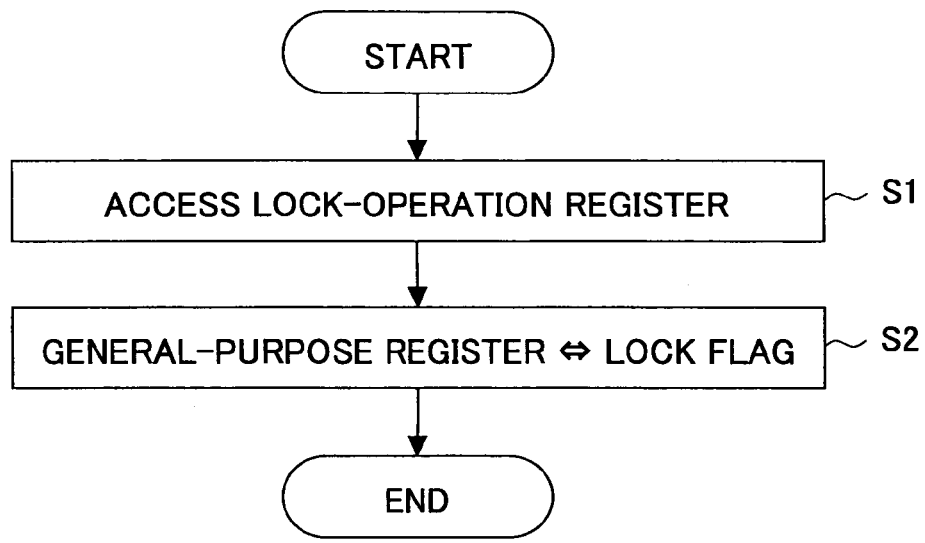
FIG. 4 is a flowchart showing an example of the operation of the multiprocessor system shown in FIG. 2.

FIG. 4 is a flowchart showing an example of the operation of the multiprocessor system shown in FIG. 2. With reference to FIG. 2 and FIG. 4, this operation will be described. In the following description, it is assumed that the lock-target selecting register 42 already stores therein a number identifying the lock flag 18 subjected to lock operation.

At step S1, the SPR load unit 27 performs a load access with respect to the lock-operation register 43 of the first exclusive control mechanism 15 via the special purpose register interface 17. The load access instruction used in this case is a special instruction so that the value of a predetermined general-purpose register of the general-purpose register set 29 is supplied to the first exclusive control mechanism 15 via the special purpose register interface 17 simultaneously with the access operation.

At step S2, the following process is performed. The lock operation controlling circuit 41 of the first exclusive control mechanism 15 requests the second exclusive control mechanism 16 to read the lock flag 18 specified by the content of the lock-target selecting register 42. The bus arbitration circuit 50 of the second exclusive control mechanism 16 arbitrates requests from a plurality of the first exclusive control mechanisms 15, and reads the value of the specified lock flag 18, followed by supplying the retrieved value to the first exclusive control mechanism 15. The first exclusive control mechanism 15 supplies the retrieved value of the lock flag 18 to the processor 10. The processor 10 stores the retrieved value of the lock flag 18 in the predetermined general-purpose register noted above.

Further, the first exclusive control mechanism 15 stores in the specified lock flag 18 the value originally stored in the general-purpose register supplied from the processor 10 simultaneously with the load access operation. That is, the lock operation controlling circuit 41 of the first exclusive control mechanism 15 requests the second exclusive control mechanism 16 to write the specified value to the lock flag 18 specified by the content of the lock-target selecting register 42. In response, the bus arbitration circuit 50 of the second exclusive control mechanism 16 writes the specified value to the specified lock flag 18.

In this manner, the processor 10 can exchange the value of the predetermined general-purpose register with the value of the specified lock flag 18. It should be noted that this operation is performed as an atomic operation. This makes it possible to perform a lock operation at high speed that is suitable for exclusive control.

Figure 5:
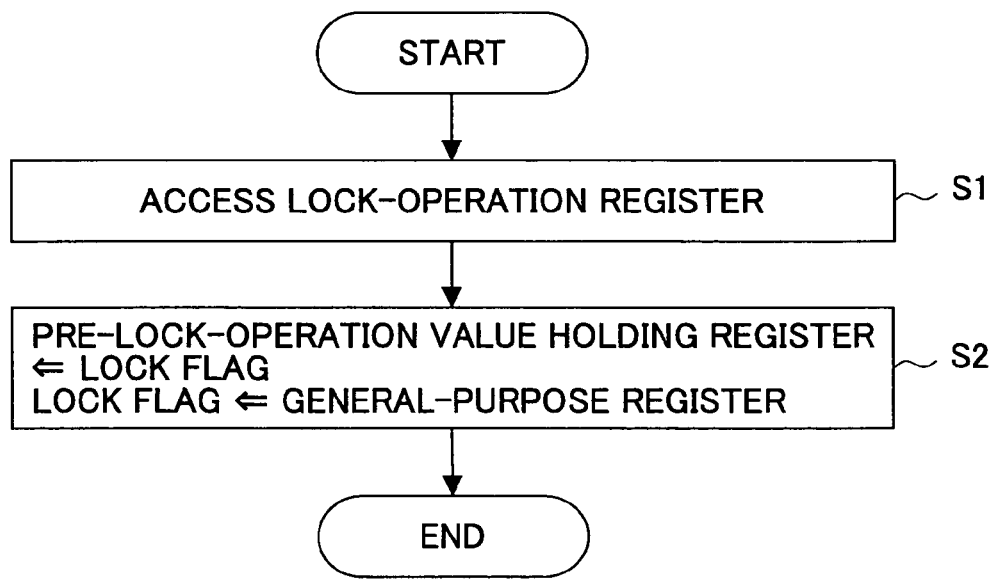
FIG. 5 is a flowchart showing another example of the operation of the multiprocessor system shown in FIG. 2.

FIG. 5 is a flowchart showing another example of the operation of the multiprocessor system shown in FIG. 2. With reference to FIG. 2 and FIG. 5, this operation will be described. In the following description, it is assumed that the lock-target selecting register 42 already stores therein a number identifying the lock flag 18 subjected to lock operation.

At step S1, the SPR load unit 27 performs a load access with respect to the lock-operation register 43 of the first exclusive control mechanism 15 via the special purpose register interface 17. The load access instruction used in this case is a special instruction so that the value of a predetermined general-purpose register of the general-purpose register set 29 is supplied to the first exclusive control mechanism 15 via the special purpose register interface 17 simultaneously with the access operation.

At step S2, the following process is performed. The lock operation controlling circuit 41 of the first exclusive control mechanism 15 requests the second exclusive control mechanism 16 to read the lock flag 18 specified by the content of the lock-target selecting register 42. The bus arbitration circuit 50 of the second exclusive control mechanism 16 arbitrates requests from a plurality of the first exclusive control mechanisms 15, and reads the value of the specified lock flag 18, followed by supplying the retrieved value to the first exclusive control mechanism 15. The first exclusive control mechanism 15 stores the retrieved value of the lock flag 18 in the pre-lock-operation value holding register 44.

Further, the first exclusive control mechanism 15 stores in the specified lock flag 18 the value of the general-purpose register supplied from the processor 10 simultaneously with the load access operation. That is, the lock operation controlling circuit 41 of the first exclusive control mechanism 15 requests the second exclusive control mechanism 16 to write the specified value to the lock flag 18 specified by the content of the lock-target selecting register 42. In response, the bus arbitration circuit 50 of the second exclusive control mechanism 16 writes the specified value to the specified lock flag 18.

In this manner, the processor 10 can store the value of the specified lock flag 18 in the pre-lock-operation value holding register 44, and can also store the value of the predetermined general-purpose register in the specified lock flag 18. It should be noted that this operation is performed as an atomic operation. This makes it possible to perform a lock operation at high speed that is suitable for exclusive control.

Figure 6:
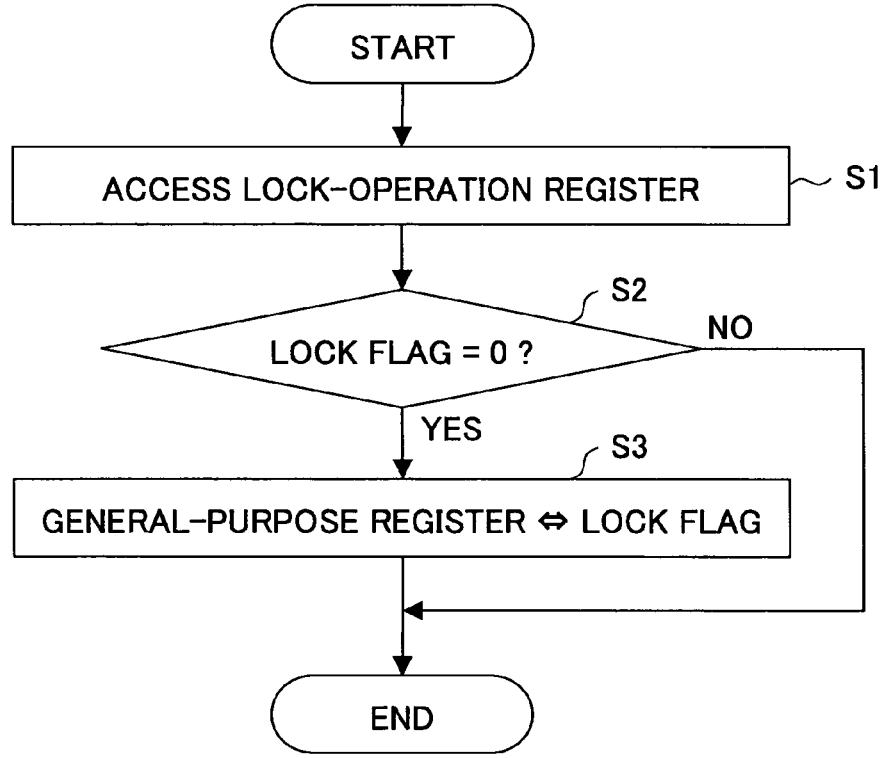
FIG. 6 is a flowchart showing another example of the operation of the multiprocessor system shown in FIG. 2.

FIG. 6 is a flowchart showing another example of the operation of the multiprocessor system shown in FIG. 2. With reference to FIG. 2 and FIG. 6, this operation will be described. In the following description, it is assumed that the lock-target selecting register 42 already stores therein a number identifying the lock flag 18 subjected to lock operation.

At step S1, the SPR load unit 27 performs a load access with respect to the lock-operation register 43 of the first exclusive control mechanism 15 via the special purpose register interface 17. The load access instruction used in this case is a special instruction so that the value of a predetermined general-purpose register of the general-purpose register set 29 is supplied to the first exclusive control mechanism 15 via the special purpose register interface 17 simultaneously with the access operation.

At step S2, the following process is performed. The lock operation controlling circuit 41 of the first exclusive control mechanism 15 requests the second exclusive control mechanism 16 to read the lock flag 18 specified by the content of the lock-target selecting register 42. The bus arbitration circuit 50 of the second exclusive control mechanism 16 arbitrates requests from a plurality of the first exclusive control mechanisms 15, and reads the value of the specified lock flag 18, followed by supplying the retrieved value to the first exclusive control mechanism 15. The first exclusive control mechanism 15 compares the retrieved value of the lock flag 18 with a predetermined value (zero in this example). In this example, the value "zero" indicates that the relevant lock flag 18 is not locked. If the retrieved value of the lock flag 18 is zero, the following process is performed at step S3.

The first exclusive control mechanism 15 supplies the retrieved value of the lock flag 18 to the processor 10. The processor 10 stores the retrieved value of the lock flag 18 in the predetermined general-purpose register noted above. Further, the first exclusive control mechanism 15 stores in the specified lock flag 18 the value originally stored in the general-purpose register supplied from the processor 10 simultaneously with the load access operation. That is, the lock operation controlling circuit 41 of the first exclusive control mechanism 15 requests the second exclusive control mechanism 16 to write the specified value to the lock flag 18 specified by the content of the lock-target selecting register 42. In response, the bus arbitration circuit 50 of the second exclusive control mechanism 16 writes the specified value to the specified lock flag 18.

In this manner, the processor 10 can exchange the value of the predetermined general-purpose register with the value of the specified lock flag 18 if the lock flag 18 is not locked. It should be noted that this operation is performed as an atomic operation. This makes it possible to perform a lock operation at high speed that is suitable for exclusive control.

Figure 7:
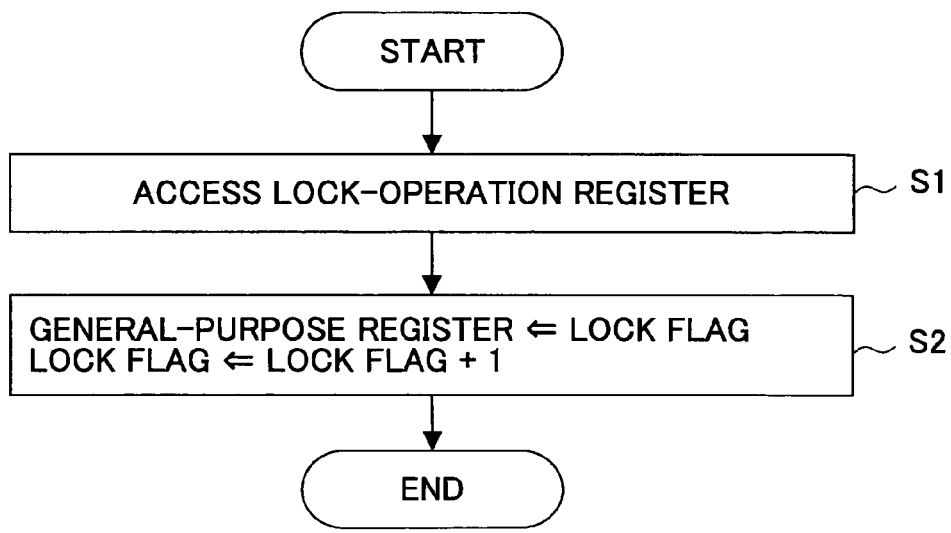
FIG. 7 is a flowchart showing another example of the operation of the multiprocessor system shown in FIG. 2.

FIG. 7 is a flowchart showing another example of the operation of the multiprocessor system shown in FIG. 2. With reference to FIG. 2 and FIG. 7, this operation will be described. In the following description, it is assumed that the lock-target selecting register 42 already stores therein a number identifying the lock flag 18 subjected to lock operation.

At step S1, the SPR load unit 27 performs a load access with respect to the lock-operation register 43 of the first exclusive control mechanism 15 via the special purpose register interface 17. The load access instruction used in this case is a special instruction that is used to read the content of the specified lock flag 18 and also to increment the content of the specified lock flag 18 by a specified value.

At step S2, the following process is performed. The lock operation controlling circuit 41 of the first exclusive control mechanism 15 requests the second exclusive control mechanism 16 to read the lock flag 18 specified by the content of the lock-target selecting register 42. The bus arbitration circuit 50 of the second exclusive control mechanism 16 arbitrates requests from a plurality of the first exclusive control mechanisms 15, and reads the value of the specified lock flag 18, followed by supplying the retrieved value to the first exclusive control mechanism 15. The first exclusive control mechanism 15 supplies the retrieved value of the lock flag 18 to the processor 10. The processor 10 stores the retrieved value of the lock flag 18 in the predetermined general-purpose register of the general-purpose register set 29.

Further, the first exclusive control mechanism 15 stores in the specified lock flag 18 a value made by adding a predetermined value (1 in this example) to the retrieved value of the lock flag 18. That is, the lock operation controlling circuit 41 of the first exclusive control mechanism 15 requests the second exclusive control mechanism 16 to write the incremented value to the lock flag 18 specified by the content of the lock-target selecting register 42. In response, the bus arbitration circuit 50 of the second exclusive control mechanism 16 writes the incremented value to the specified lock flag 18.

In this manner, the processor 10 can store the value of the specified lock flag 18 in the predetermined general-purpose register, and can also increment the content of the lock flag 18 by a predetermined incremental value. It should be noted that this operation is performed as an atomic operation. This makes it possible to perform a lock operation at high speed that is suitable for exclusive control.

FIG. 8 is a sequence diagram showing an example of the release wait operation of the multiprocessor system shown in FIG. 2. With reference to FIG. 2 and FIG. 8, this release wait operation will be described.

The SPR store unit 28 of the processor 10 (PE#0) stores a number identifying the lock flag 18 subjected to lock operation in the lock-target selecting register 42 of the first exclusive control mechanism 15 via the special purpose register interface 17 (S1). Another processor 10 (PE#1) stores a number identifying the lock flag 18 subjected to lock operation in the lock-target selecting register 42 of the corresponding first exclusive control mechanism 15 (S2). Here, the lock flag 18 specified at step S1 is the same as the lock flag 18 specified at step S2.

After this, the SPR store unit 28 of the processor 10 (PE#0) requests to write a value in the lock-release-wait register 45 of the first exclusive control mechanism 15 via the special purpose register interface 17 (S3). After this process, the processor 10 (PE#0) suspends its operation, and lapses into a release wait state. The lock operation controlling circuit 41 of the first exclusive control mechanism 15 corresponding to PE#0 notifies the second exclusive control mechanism 16 that the processor 10 (PE#0) waits for lock release with respect to the lock flag 18 specified by the content of the lock-target selecting register 42 (S4). The second exclusive control mechanism 16 stores a number identifying the specified lock flag 18 in the PE-release-wait lock-number register 52 corresponding to PE#0.

The processor 10 (PE#1) requests the corresponding first exclusive control mechanism 15 to release the lock flag 18 subjected to the lock operation (S5). This is achieved by using an SPR store instruction that requests to write a value indicative of release (e.g., "0") to the lock-operation register 43. In response, the first exclusive control mechanism 15 corresponding to PE#1 instructs the second exclusive control mechanism 16 to release the specified lock flag 18.

The lock-release notification unit 51 of the second exclusive control mechanism 16 detects the release of the lock flag 18 specified by the PE-release-wait lock-number register 52 corresponding to PE#0, and notifies the lock-release-wait controlling circuit 40 of the first exclusive control mechanism 15 corresponding to PE#0 of the lock release (S6). In response to the notice of the lock release from the second exclusive control mechanism 16, the lock-release-wait controlling circuit 40 instructs the execution control unit 34 of the processor 10 (PE#0) to resume the operation of the processor 10.

With this provision, the processor 10 can suspend its operation to wait for the release of the desired lock flag 18, and resumes its operation in response to the release of the lock flag 18, thereby gaining exclusive access to the shared resource.

Further, as previously described, the second exclusive control mechanism 16 is provided with the lock-release-wait interruption generating unit 53, based on which interruption control may be exercised. Namely, when there is a processor 10 waiting for lock release, the detection of the release of the lock subjected to lock-release wait results in an instruction being given to the interruption unit 60 to issue an interruption. In response to the instruction to issue an interruption, the interruption unit 60 issues an interruption to the processor 10 waiting for the lock release. In response to the interruption, the processor 10 having been waiting for lock release gains exclusive access to the shared resource that was awaited for lock release. Operations performed in this case are substantially the same as the operations relating to lock release wait as previously described, except that the lock-release-wait interruption generating unit 53, instead of the lock-release notification unit 51, detects and reports lock release, that the interruption unit 60, rather than the lock-release-wait controlling circuit 40, notifies the processor 10 of the release, and that the processor 10 performs other tasks rather than suspending its operation. A detailed description of these operations will be omitted.

In the embodiments described above, only the main memory device 12 has been referred to as a shared resource. Nonetheless, shared resources controllable through exclusive control management by use of the lock flag 18 of the present invention are not limited to memories. As long as devices are shared by a plurality of the processors 10, the use of the lock flag 18 can attain high-speed exclusive control management with respect to any devices regardless of whether they are built-in devices in the system or peripheral devices.

Further, the present invention is not limited to these embodiments, but various variations and modifications may be made without departing from the scope of the present invention.

The present application is based on Japanese priority application No. 2004-380618 filed on Dec. 28, 2004, with the Japanese Patent Office, the entire contents of which are hereby incorporated by reference.

What is claimed is:

1. A multiprocessor system, comprising:
   a plurality of processors;
   interconnect network bus coupled to said plurality of processors;
   a resource coupled to said interconnect network bus and shared by said plurality of processors; and
   an exclusive control unit coupled to said plurality of processors and configured to include a lock flag indicative of a locked/unlocked state regarding exclusive use of said resource,
   wherein the processors include a special purpose register interface coupled to said exclusive control unit, and are configured to access the lock flag by executing a special purpose register access through the special purpose register interface rather than executing a memory access through the interconnect network bus.

2. The multiprocessor system as claimed in claim 1, wherein each of the processors includes:
   a special purpose register set; and
   an access unit coupled to said special purpose register set to access said special purpose register set,
   wherein said access unit is further coupled to said special purpose register interface and configured to access the lock flag through the special purpose register interface in response to a predetermined special purpose register access instruction.

3. The multiprocessor system as claimed in claim 1, wherein said resource includes a memory, and said interconnect network bus is coupled to said exclusive control unit, said plurality of processors operable to access the lock flag by accessing memory space of said memory.

4. The multiprocessor system as claimed in claim 1, wherein said exclusive control unit includes:
   a plurality of first exclusive control units individually coupled to the respective processors; and
   a second exclusive control unit coupled to said first exclusive control units,
   wherein the lock flag is provided in said second exclusive control unit, and said second exclusive control unit includes an arbitration circuit configured to arbitrate requests to access the lock flag supplied from the first exclusive control units.

5. The multiprocessor system as claimed in claim 4, wherein said shared resource includes a plurality of shared resource items, and wherein lock flags each identical to the lock flag are provided in one-to-one correspondence with the respective resource items in said second exclusive control unit, said plurality of first exclusive control units including a lock-target selecting register for identifying one of the lock flags to be accessed.

6. The multiprocessor system as claimed in claim 4, wherein the first exclusive control units include a pre-lock-operation value holding register for storing therein a value of one of the lock flags that is in existence before operation is performed on said one of the lock flags.

7. The multiprocessor system as claimed in claim 1, wherein said exclusive control unit is configured to respond to lock release of the lock flag by instructing one of the processors to resume operation when said one of the processors is in a suspended state waiting for lock release of the lock flag.

8. The multiprocessor system as claimed in claim 1, wherein said exclusive control unit is configured to respond to lock release of the lock flag or issuing of an interruption request by instructing one of the processors to resume operation when said one of the processors is in a suspended state waiting for lock release of the lock flag.

9. The multiprocessor system as claimed in claim 1, wherein said exclusive control unit is configured to respond to lock release of the lock flag by issuing an interruption to one of the processors that is in a suspended state waiting for lock release of the lock flag.

10. A method of controlling a lock flag in a multiprocessor system which includes a plurality of processors, an interconnect network bus coupled to said plurality of processors, a resource coupled to said interconnect network bus and shared by said plurality of processors, comprising:
    accessing a lock flag in an exclusive control unit from one of the processors by executing a special purpose register access through a special purpose register interface rather than a memory access through the interconnect network bus, said special purpose register interface being coupled to said exclusive control unit, the lock flag indicating a locked/unlocked state regarding exclusive use of said resource.

* * * * *